United States Patent [19]
Goor

[11] Patent Number: 5,653,501
[45] Date of Patent: Aug. 5, 1997

[54] INFLATABLE RESTRAINT SYSTEM

[75] Inventor: Dan Goor, Colorado Springs, Colo.

[73] Assignee: XCSI, Inc., Colorado Springs, Colo.

[21] Appl. No.: 602,236

[22] Filed: Feb. 16, 1996

[51] Int. Cl.[6] .................................................. B60R 21/00
[52] U.S. Cl. ............................ 297/216.11; 297/250.1
[58] Field of Search .......................... 297/250.1, 256.15, 297/DIG. 3, 487, 216.11; 280/728.1

[56] References Cited

U.S. PATENT DOCUMENTS

| | | |
|---|---|---|
| 3,430,979 | 3/1969 | Terry et al. . |
| 3,510,150 | 5/1970 | Wilfert . |
| 3,672,699 | 6/1972 | De Wint ............................ 280/150 AB |
| 3,706,462 | 12/1972 | Lilly ................................. 280/150 AB |
| 3,706,463 | 12/1972 | Lipkin .............................. 280/150 AB |
| 3,767,227 | 10/1973 | Furusho et al. ................... 280/150 AB |
| 3,792,872 | 2/1974 | Jones ................................ 280/150 AB |
| 3,844,581 | 10/1974 | Fox .................................. 280/150 AB |
| 3,866,940 | 2/1975 | Lewis ............................... 280/150 AB |
| 3,883,053 | 5/1975 | Pritchard et al. ........................ 224/5 P |
| 3,905,615 | 9/1975 | Schulman ......................... 280/150 AB |
| 3,951,450 | 4/1976 | Gambotti .............................. 297/238 |
| 3,953,049 | 4/1976 | Surace et al. ........................... 280/730 |
| 3,971,569 | 7/1976 | Abe et al. .............................. 280/733 |
| 3,975,037 | 8/1976 | Hontschik et al. ..................... 280/733 |
| 3,975,258 | 8/1976 | Fox ....................................... 280/733 |
| 3,985,374 | 10/1976 | Powaska ................................ 280/730 |
| 4,348,037 | 9/1982 | Law et al. .............................. 280/733 |
| 4,360,223 | 11/1982 | Kirchoff ................................ 280/729 |
| 4,436,341 | 3/1984 | Converse ............................ 297/256.15 |
| 4,533,176 | 8/1985 | Wyttenbach .......................... 297/238 |
| 4,632,460 | 12/1986 | Meeker et al. ......................... 297/467 |
| 4,664,443 | 5/1987 | Casale ................................... 297/238 |
| 4,690,455 | 9/1987 | Bailey et al. .......................... 297/238 |
| 4,715,617 | 12/1987 | Breed ................................... 280/731 |
| 4,749,229 | 6/1988 | Dorto .................................... 297/238 |
| 4,834,420 | 5/1989 | Sankrithi et al. ...................... 280/728 |
| 4,971,354 | 11/1990 | Kim ..................................... 280/733 |
| 5,031,932 | 7/1991 | Frantom et al. ....................... 280/741 |
| 5,064,483 | 11/1991 | Zeuner ................................... 149/35 |
| 5,106,158 | 4/1992 | Dukatz et al. .......................... 297/396 |
| 5,375,908 | 12/1994 | Goor ............................... 297/256.15 X |
| 5,390,952 | 2/1995 | Goor ............................... 297/216.11 X |
| 5,511,850 | 4/1996 | Coursey ........................... 297/256.15 X |

FOREIGN PATENT DOCUMENTS

| | | |
|---|---|---|
| 2046426 | 3/1972 | Germany . |
| 2306881 | 8/1974 | Germany . |
| 8807947 | 10/1988 | WIPO . |

OTHER PUBLICATIONS

Instruction Manual entitled "Restraint Systems," 8M–1 (No date), 7 pages.

*Primary Examiner*—Milton Nelson, Jr.
*Attorney, Agent, or Firm*—Weingarten, Schurgin, Gagnebin & Hayes LLP

[57] ABSTRACT

An inflatable restraint system includes an airbag restraint module defining an opening for deploying an airbag perpendicularly to a seat surface. In one embodiment, a child safety seat includes an airbag restraint belt for positioning the airbag. The child safety seat may include an inertial sensor for triggering airbag inflation.

12 Claims, 3 Drawing Sheets

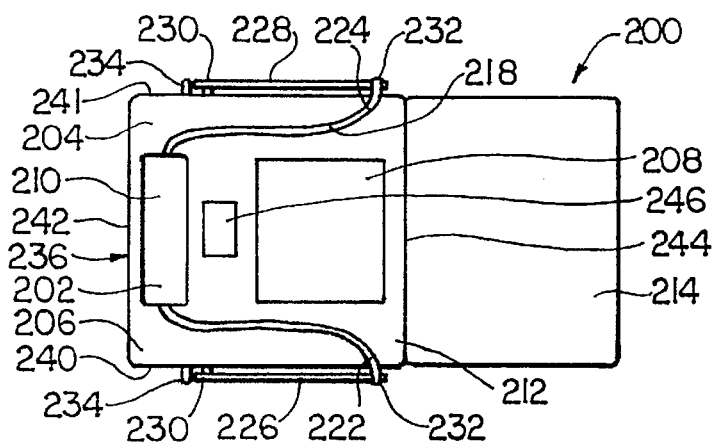
FIG. 1
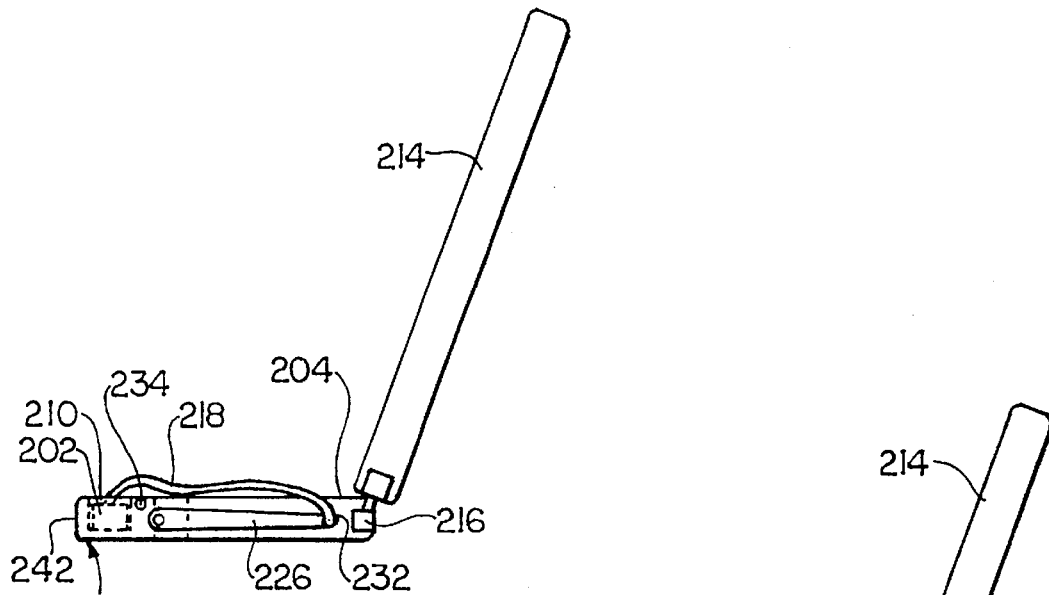
FIG. 2
FIG. 3

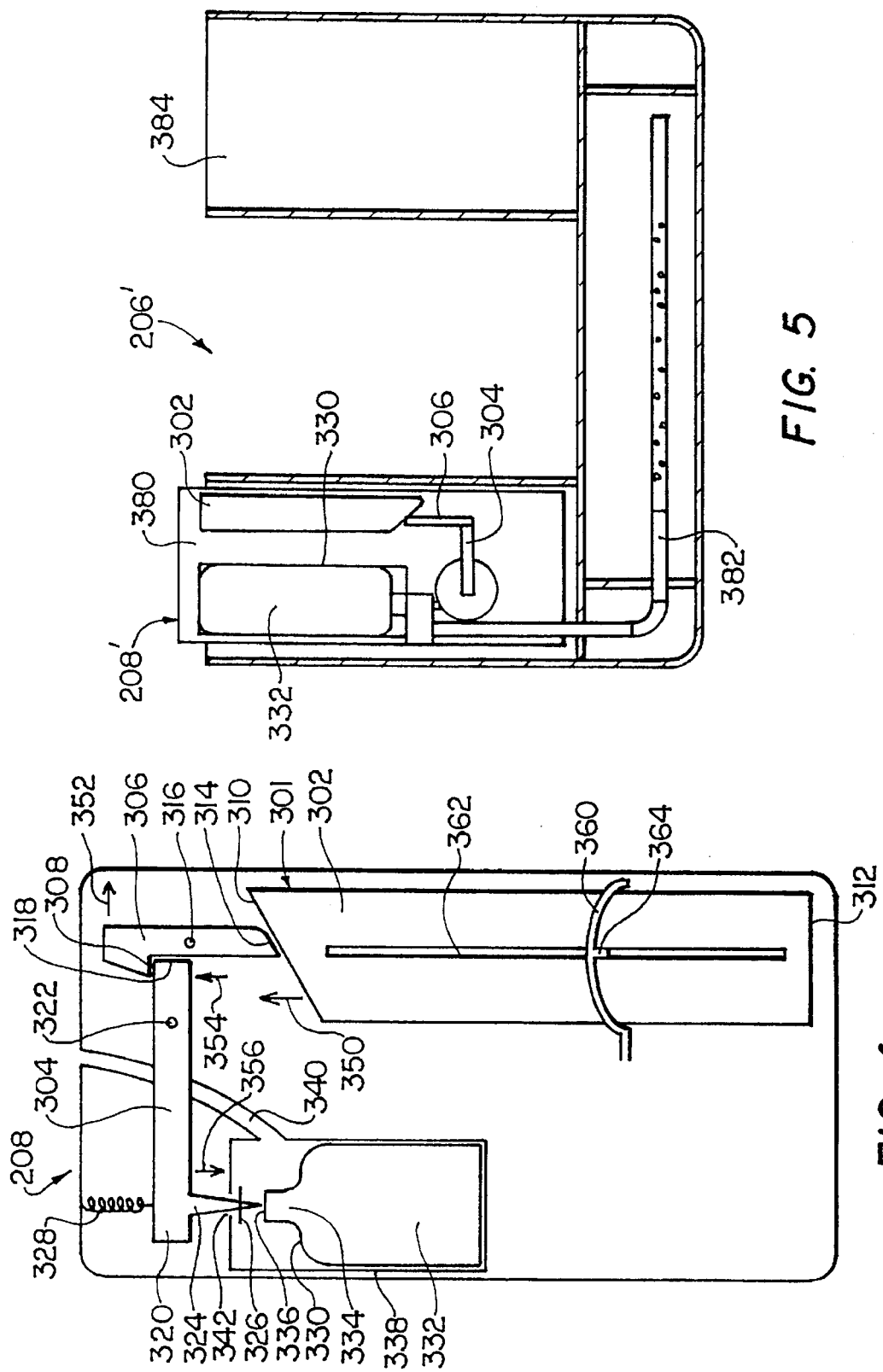

INFLATABLE RESTRAINT SYSTEM

FIELD OF THE INVENTION

The present invention relates generally to passive vehicle restraint systems and, more specifically, to an inflatable occupant restraint system for a child seat.

BACKGROUND OF THE INVENTION

Various vehicle safety devices and passenger restraint systems are known in the art for protecting the occupants of a vehicle in the event of an accident. Airbags, for example, provide a cushioned barrier between the occupant and the fixed surroundings of the vehicle passenger compartment for absorbing the forces exerted on the occupant in the collision. However, airbags are generally installed in the dashboard of a vehicle and are completely unsuited for protecting infants in a child seat.

SUMMARY OF THE INVENTION

The present invention provides a child safety seat including an airbag restraint module having an activation device for initiating inflation of an airbag, and an airbag restraint module housing the activation device and defining an opening through which the airbag is deployed in a direction substantially perpendicular to a seating surface. In a further embodiment, the child safety seat includes an airbag restraint belt positionable to inhibit movement of the airbag in a predetermined direction. In yet another embodiment, the activation device includes an inertial sensor.

DESCRIPTION OF THE DRAWINGS

Other features and advantages of the invention will be apparent from the following detailed description of the invention in conjunction with the accompanying drawings, in which:

FIG. 1 is a top view of a child safety seat incorporating an airbag restraint module in accordance with the invention;

FIG. 2 is a side view of the child safety seat of FIG. 1;

FIG. 3 is a side view of the child safety seat of FIG. 1 showing an airbag in a deployed state;

FIG. 4 is a top view of an activation device for the airbag restraint module of FIG. 1;

FIG. 5 is a top view of an alternative embodiment of the activation device of FIG. 4;

DETAILED DESCRIPTION OF THE INVENTION

Figure 7:
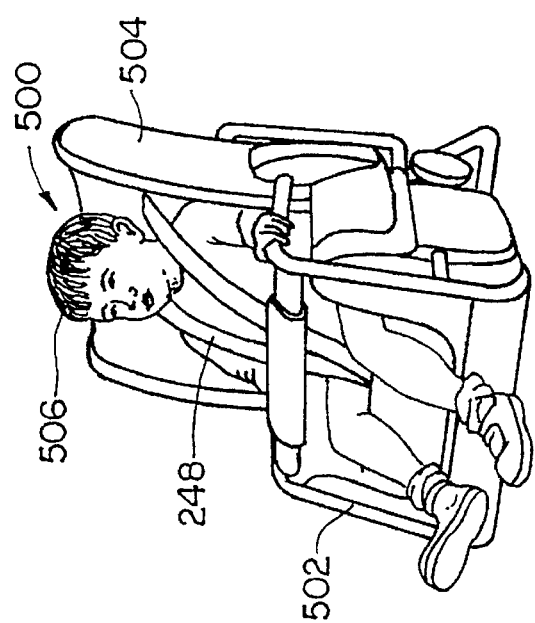
FIG. 7 is a perspective view of an alternative embodiment of the child safety seat of FIG. 1.

FIGS. 1–3 illustrate a child safety seat 200 for protecting an occupant (not shown) thereof by providing an airbag 202 which is inflatable in a direction substantially perpendicular to a seating surface 204. The child safety seat further includes an airbag restraint module 206, and an activation device 208 housed within the airbag restraint module 206. The module 206 defines an opening 210 in a housing surface 212 through which the airbag 202 inflates substantially perpendicular to the seating surface 204. The airbag 202 inflates from a predeployment state below the seating surface 204 to a deployed state proximate the occupant. The activation device 208 is responsive to a predetermined level of negative acceleration wherein the activation device initiates inflation of the airbag 202.

In an exemplary embodiment, the child safety seat 200 further includes a backrest 214 secured to the module by a hinge 216 and/or an airbag restraint belt 218 positionable to inhibit movement of the airbag 202. A portion of the airbag restraint belt 218 can be disposed within at least one loop 220 secured to the airbag 202. Other means to attach the belt 218 to the airbag 202 may be used such as glue or other means known to those skilled in the art. The airbag restraint belt 218 includes a first end 222 and a second end 224, wherein each end is secured to the airbag restraint module 206. The module 206 further includes a first belt positioning member 226 and a second belt positioning member 228, each member pivotally secured to the module at a first end 230 and secured to the airbag restraint belt 218 at a second end 232. Each of the first and second belt positioning members 226 and 228 respectively, are movable from a first position substantially parallel to the seating surface 204 to a second position substantially perpendicular to the seating surface 204. Member posts 234 affixed to the module 206 prevent the first and second belt positioning members 226, 228 from rotating more than about ninety degrees. Other configurations for the belt positioning members include pop-up or telescopic members proximate the forward portion of the seat or other devices that can position the belt in a predetermined manner. Rotation of the belt positioning members 226, 228 can be limited by equivalents of the member posts 234. Further, a ninety degree rotation is only exemplary as it will be appreciated that other angles can easily be implemented without departing from the spirit of the invention.

The module 206 further includes a housing 236 having a top portion or housing surface 212, a bottom portion 238, a first side portion 240, a second side portion 241, a front portion 242, and a back portion 244. As shown, the housing surface 212 includes the seating surface 204, but other configurations are contemplated wherein the housing and seating surfaces are separated. The housing 236 is rectangular in the exemplary embodiment, but other configurations are possible, including a shape substantially conforming to the anatomy of a typical occupant of the child safety seat 200. As shown, a portion of the airbag restraint belt 218 rests on the top portion 212 of the housing 236 until airbag deployment. However, all or a portion of the belt 218 can be concealed or housed within the module 206, or by a covering thereon. Proximate the opening 210 for escape of the airbag 202 at the front and center of the seating surface 204 is an restraint belt cavity 246 which allows a portion of an occupant restraint belt 248 (FIG. 7) to pass through the airbag restraint module 206. The cavity 246 is located in the front and center of the module 206 proximate the airbag opening 210.

FIG. 3 illustrates the airbag 202 in a deployed state and the first and second belt positioning members 226, 228 in the second position. The inflating airbag 202 operates to bring the airbag restraint belt 218 to a level higher than the seating surface 204 as the airbag transitions from the predeployment state to the deployed state through the opening 210.

FIG. 4 shows the airbag activation device 208 including an inertial sensor 301 for initiating inflation of the airbag 202 in the presence of a g-force or acceleration greater than a predetermined threshold. The sensor 301 includes a weight 302 movable from a first position to a second position and an activation member 304 that is responsive to movement of the weight for initiating inflation of the airbag 202.

In an illustrative embodiment, the sensor 301 includes a release member 306 having a shoulder 308 that is engagable with the activation member 304. The weight 302 includes a first end 310 and a second end 312, wherein the first end is bevelled. The release member 306 includes a first end 314, and a release member pivot point 316, wherein the release member first end is bevelled in a manner to compliment the bevelled first end 310 of the weight 302. In the exemplary embodiment, the weight 302 is cylindrical, but other configurations are contemplated.

The activation member 304 includes a first end 318, a second end 320, an activation member pivot point 322, and a spike portion 324 having a flap 326 affixed thereto. Prior to airbag deployment, the activation mender first end 318 abuts the release member shoulder 308. The sensor 301 may further include an activation member bias element 328, such as a spring, for biasing the activation member spike portion 324 about the activation member pivot point 322, wherein the activation member first end 318 is biased to remain within the release member shoulder 308.

The activation device 208 further includes a gas container 330 filled with compressed gas 332 such as nitrogen, and a container outlet 334 wherein a membrane 336 retains the gas within the gas container. Other non-toxic compressible gases may be used such as air, carbon dioxide, argon, or other suitable gases or mixtures thereof. A guide 338 includes a gas outlet 340 in communication with the airbag 202 and an aperture 342 of sufficient diameter to accept a portion of the activation member spike portion 324. A pressure gauge (not shown) may be provided to allow a user to determine whether the container 330 has a sufficient amount of compressed gas 332 to adequately inflate the airbag 202.

An alternative embodiment of the module 206' is shown in FIG. 5. The module 206' includes a first device cavity 380 housing the activation device 208'. The gas outlet 340 leads to a copper tube 382. The tube 382 may be formed from other material such as plastic or steel, and may have perforations allowing the gas 332 to inflate the airbag 202 more rapidly than a single hole at the end of the tube. Additional activation devices may be housed within a second device cavity 384, including devices configured to initiate airbag inflation in response to oblique or side impacts.

In operation, when the predetermined g-force or acceleration threshold has been exceeded, the weight 302 moves toward the release member 306 as shown by weight direction arrow 350. The weight first end 310 applies pressure to the release member first end 314 causing the release member 306 to rotate about the release member pivot point 316 as indicated by release member direction arrow 352. As the release member 306 rotates about the release member pivot point 316, the release member shoulder 308 disengages from the activation member first end 318. The activation member first end 318, being biased towards the release member shoulder 308 by the activation member bias element 328, rotates about the activation member pivot point 322 as shown by activation member direction arrow 354. Coincidentally, the activation member second end 320 rotates toward the gas container 330 as illustrated by gas release arrow 356.

The activation member spike portion 324 enters the aperture 342 and punctures the membrane 336 thereby allowing the compressed gas 332 to escape. The escaping gas 332 forces the flap 326 into the aperture 342, thereby preventing any decompressing gas from escaping through the aperture. The gas 332 leaves the guide 338 via the gas outlet 340 which is in communication with the airbag 202 causing inflation of the airbag to occur.

Modifications and further alternative embodiments of the activation device are contemplated. For example, at least one retaining strap 360 may be provided to prevent lateral motion of the weight 302. A channel 362 may be provided in conjunction with a guide post 364 to prevent rotation of the weight 302. Further, the weight 302 may be biased against movement towards the release member 306 by some type of bias element such as a helical spring. Other features are also contemplated, such as an adjustable g-force threshold which may be implemented by the modifying the mass or geometry of the weight, adjusting the frictional forces applied to the weight, or using weight bias elements of differing bias strengths.

Figure 6:
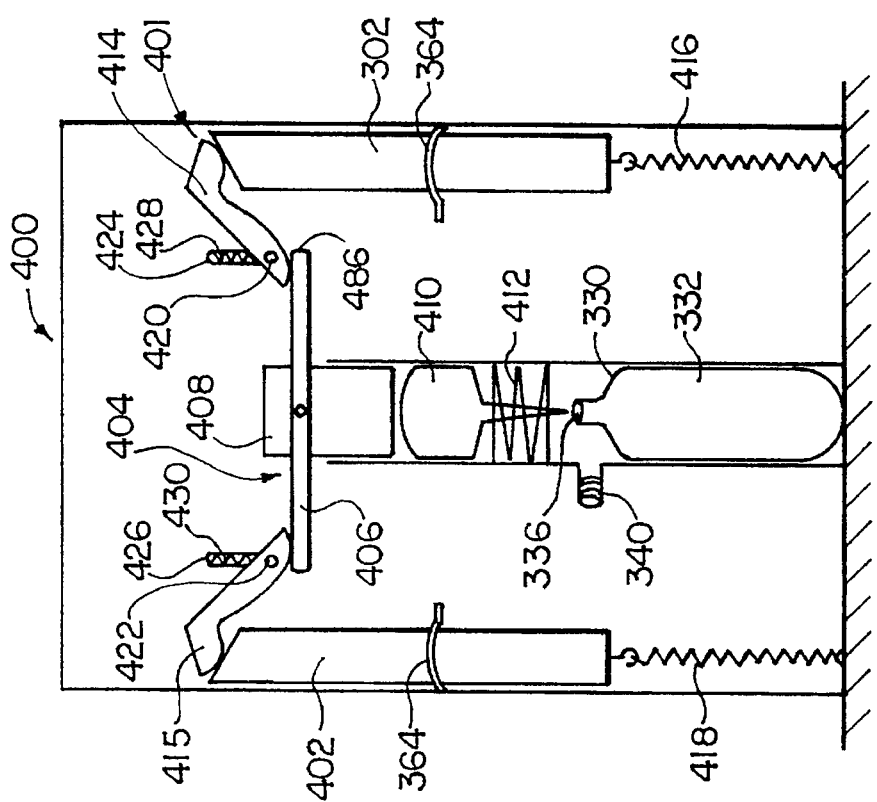
FIG. 6 is a top view of a further alternative embodiment of the a device of FIG. 4.

FIG. 6 illustrates a further embodiment of an activation device 400 and inertial sensor 401 for reducing the probability of airbag initiation without the presence of a g-force greater than a predetermined threshold. The sensor 401 requires substantially simultaneous movement of the weight 302 and a further weight 402 to initiate inflation of the airbag 202.

In an exemplary embodiment, an activation member 404 includes a rod 406 pivotally attached to a plunger 408 and a spiked puncture member 410 biased by a puncture member bias element 412 away from the gas container 330. The sensor 401 further includes release member 414 and further release member 415 associated with the further weight 402. The weights 302, 402 are biased against movement towards the respective release members 414, 415 by respective weight bias elements 416, 418, which may be helical springs for example. The release members 414, 415 further include respective pivot points 420, 422 which are movable within slots 424, 426. The release members 414, 415 are biased towards the rod 406 by pivot point bias elements 428, 430.

To initiate inflation of the airbag 202, the weights 302, 402 move towards respective release members 414, 415 in response to a g-force greater than the predetermined threshold, 9 g's for example. The movement of the weights 302, 402 forces the associated release member 414, 415 to rotate about the respective release member pivot points 420, 422. The rotation causes the release members 414, 415 to impinge upon the rod 406 causing the plunger 408 to pressure the puncture member 410 thereby overcoming the bias of the puncture bias element 412. The spiked puncture member 410 penetrates the gas container membrane 336 releasing the compressed gas 332 and inflating the airbag 202.

If the weights 302, 402 do not move in substantial unison, only one of the release members 414, 415 rotates. The rotating release member 414, 415 causes the rod 406 to rotate causing the other release member to move in the respective slot 424, 426 away from the rod 406.

Figure 8:
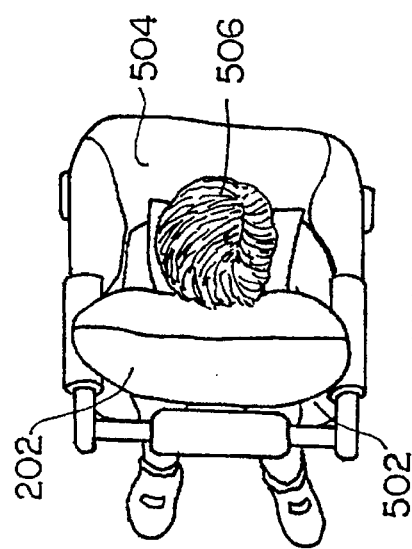
FIG. 8 is a top view of the child safety seat of FIG. 7 shown in a deployed state.

A further embodiment of a child safety seat 500 is illustrated in FIGS. 7 and 8. The seat 500 includes a seat portion 502 and a backrest 504, wherein the airbag restraint module 206 is housed within the seat portion. The deployed airbag 202 envelops a frontal portion of a child safety seat occupant 506 thereby affording impact protection to the occupant. Other airbag shapes and sizes are possible. For example, an airbag may be shaped in a semicircular or "U" shaped configuration, or two or more interconnected sections that inflate in different areas in relation to the occupant thereby providing additional lateral protection for the chest, back and sides of the occupant. Further, a transparent airbag may be used to prevent a loss of an occupant's field of view, thereby reducing apprehension caused by a fully inflated non-transparent airbag.

Additionally, a plurality of airbag restraint modules may be combined, wherein each module is oriented to respond to other than frontal impacts. Multiple airbag restraint modules may be contained within a single seat portion or stacked one on top of the other. Also, a safety switch may be provided wherein airbag deployment is prevented unless an occupant is detected within the child safety seat.

The presently described embodiments of inflatable restraint system are illustrative of a novel apparatus for providing dynamic protection for the occupants of a moving vehicle. It will be appreciated that other modifications, embodiments and departures from the present disclosure are possible without departing from the inventive concept contained herein. Consequently, the invention is to be viewed as embracing each and every novel feature as well as any novel combination of features present in, or possessed by, the inflatable restraint system disclosed herein and is to be limited solely by the scope and spirit of the appended claims.

What is claimed is:

1. A child safety seat having a seating surface comprising:
   an airbag that is inflatable from a predeployment state to a deployed state;
   an activation device for initiating inflation of said airbag; and
   an airbag restraint module housing said activation device and said airbag in said predeployment state below said seating surface, and said airbag restraint module having a housing surface that defines an opening through which at least a portion of said airbag is inflatable from said predeployment state to said deployed state in a direction substantially perpendicular to said seating surface;
   wherein said child safety seat further comprises an airbag restraint belt positionable to inhibit movement of said airbag in a predetermined direction.

2. The child safety seat according to claim 1, wherein a portion of said airbag restraint belt is secured to said module.

3. The child safety seat according to claim 1, wherein said module further includes a belt positioning member movable from a first position to a second position and wherein a portion of said airbag restraint belt is secured to said belt positioning member.

4. The child safety seat according to claim 3, wherein said belt positioning member positions a portion of said belt at a point higher than said seating surface.

5. The child safety seat according to claim 1, wherein said housing surface of said airbag restraint module includes said seating surface.

6. The child safety seat according to claim 1, wherein said child safety seat includes an occupant restraint belt portion that is proximate a front and center portion of said seating surface and wherein said opening defined by said airbag restraint module is proximate said occupant restraint belt portion.

7. The child safety seat according to claim 1, wherein said activation device includes an inertial sensor.

8. The child safety seat according to claim 7, wherein said inertial sensor includes a weight movable from a first position a second position and an activation member responsive to movement of said weight for initiating inflation of said airbag.

9. The child safety seat according to claim 8, wherein said airbag restraint module includes a container filled with compressed gas and having an outlet for said compressed gas that includes a puncturable membrane, and wherein said activation member is configured to puncture said membrane in response to movement of said weight.

10. A child safety seat having a seating surface, comprising:
    an airbag that is inflatable from a predeployment state to a deployed state;
    an activation device for initiating inflation of said airbag;
    an airbag restraint module housing said activation device and said airbag in said predeployment state below said seating surface, and said airbag restraint module having a housing surface that defines an opening through which at least a portion of said airbag is inflatable from said predeployment state to said deployed state in a direction substantially perpendicular to said seating surface;
    an airbag restraint belt positionable to inhibit movement of said airbag; and
    a belt positioning member movable from a first position to a second position and wherein a portion of said airbag restraint belt is secured to said belt positioning member.

11. A child safety seat having a seating surface, comprising:
    an airbag that is inflatable from a predeployment state to a deployed state;
    an activation device including an inertial sensor for initiating inflation of said airbag, said inertial sensor including a weight movable from a first position to a second position and an activation member responsive to movement of said weight for initiating inflation of said airbag;
    an airbag restraint module housing said activation device and said airbag in said predeployment state below said seating surface, and said airbag restraint module having a housing surface that defines an opening through which at least a portion of said airbag is inflatable from said predeployment state to said deployed state in a direction substantially perpendicular to said seating surface;
    an airbag restraint belt positionable to inhibit movement of said airbag; and
    a container filled with compressed gas and having an outlet for said compressed gas that includes a puncturable membrane, said outlet being in communication with said airbag, and wherein said activation member is configured to puncture said membrane in response to movement of said weight.

12. A child safety seat having a seating surface, comprising:
    an airbag that is inflatable from a predeployment state to a deployed state;
    an activation device including an inertial sensor for initiating inflation of said airbag, said inertial sensor including a weight movable from a first position to a second position and an activation member responsive to movement of said weight for initiating inflation of said airbag;
    an airbag restraint module housing said activation device and said airbag in said predeployment state below said seating surface, and said airbag restraint module having a housing surface that defines an opening through which at least a portion of said airbag is inflatable from said predeployment state to said deployed state in a direction substantially perpendicular to said seating surface;
    a container filled with compressed gas and having an outlet for said compressed gas that includes a puncturable membrane, said outlet being in communication with said airbag, and wherein said activation member is configured to puncture said membrane in response to movement of said weight;

an airbag restraint belt positionable to inhibit movement of said airbag; and a belt positioning member movable from a first position to a second position and wherein a portion of said airbag restraint belt is secured to said belt positioning member.

* * * * *